(12) United States Patent
Green

(10) Patent No.: US 10,866,221 B2
(45) Date of Patent: Dec. 15, 2020

(54) GAS CHROMATOGRAPHY WITH VACUUM ULTRA-VIOLET DETECTOR AND MASS SPECTROMETER OR ION MOBILITY SPECTROMETER

(71) Applicant: MICROMASS UK LIMITED, Wilmslow (GB)

(72) Inventor: Martin Raymond Green, Bowdon (GB)

(73) Assignee: MICROMASS UK LIMITED, Wilmslow (GB)

( * ) Notice: Subject to any disclaimer, the term of this patent is extended or adjusted under 35 U.S.C. 154(b) by 0 days.

(21) Appl. No.: 16/341,851

(22) PCT Filed: Oct. 16, 2017

(86) PCT No.: PCT/GB2017/053122
§ 371 (c)(1),
(2) Date: Apr. 12, 2019

(87) PCT Pub. No.: WO2018/069735
PCT Pub. Date: Apr. 19, 2018

(65) Prior Publication Data
US 2019/0324003 A1    Oct. 24, 2019

(30) Foreign Application Priority Data

Oct. 14, 2016  (GB) .................................. 1617460.9

(51) Int. Cl.
*G01N 30/72* (2006.01)
*G01N 30/74* (2006.01)
(Continued)

(52) U.S. Cl.
CPC .......... *G01N 30/72* (2013.01); *G01N 27/622* (2013.01); *G01N 30/74* (2013.01); *H01J 49/26* (2013.01); *G01N 2021/335* (2013.01)

(58) Field of Classification Search
USPC ....................................................... 250/281
See application file for complete search history.

(56) References Cited

U.S. PATENT DOCUMENTS 6,763,322 B2 *  7/2004  Potyrailo ................ G01J 3/28
378/4
7,098,672 B2 *  8/2006  Belyakov ............... G01N 1/22
324/451
(Continued)

FOREIGN PATENT DOCUMENTS

CN    105628783 A1    6/2016
WO      0119501 A1    3/2001
(Continued)

OTHER PUBLICATIONS

Schug; et. al, "Vacuum Ultraviolet Detector for Gas Chromatography", Anal. Chem. 2014, 86, pp. 8329-8335 (Year: 2014).*
(Continued)

*Primary Examiner* — Phillip A Johnston

(57) ABSTRACT

Disclosed herein is an ion analysis instrument combining a chromatographic or other separation device for separating gaseous analyte material according to retention time with an ultra-violet ("UV") spectrometer or detector for obtaining ultra-violet spectral data of at least a portion of the analyte material separated in said chromatographic or other separation device and a mass and/or ion mobility spectrometer for obtaining mass and/or ion mobility spectral data of ions generated from at least a portion of the analyte material separated in said chromatographic or other separation device. This instrument is able to provide highly orthogonal multidimensional data sets.

20 Claims, 1 Drawing Sheet

(51) Int. Cl.
*H01J 49/26* (2006.01)
*G01N 21/33* (2006.01)

(56) References Cited

U.S. PATENT DOCUMENTS

| | | | |
|---|---|---|---|
| 2006/0289809 A1 | 12/2006 | Bonne et al. | |
| 2009/0113982 A1* | 5/2009 | Hodyss | G01N 30/74 73/1.06 |
| 2009/0179147 A1 | 7/2009 | Milgram et al. | |

FOREIGN PATENT DOCUMENTS

| | | |
|---|---|---|
| WO | 2004034049 A1 | 4/2004 |
| WO | 2011157781 A1 | 12/2011 |
| WO | 2014062419 A1 | 4/2014 |
| WO | 2014108992 A1 | 1/2017 |

OTHER PUBLICATIONS

International Search Report and Written Opinion for International Application No. PCT/GB2017/053122 dated Feb. 15, 2018, 22 pages.
Search Report for United Kingdom Patent Application No. GB1617460.9 dated Jun. 2, 2017.
Combined Search and Examination Report under Sections 17 and 18(3) for United Kingdom Patent Application No. GB1716954.1 dated Apr. 16, 2018.
Hackett et al., "Ultraviolet-Visible Detection for Capillary Gas Chromatography and Combined Ultraviolet-Mass Spectrometry Using a Remote Flow Cell", Journal of Chromatography, vol. 695, pp. 243-257, 1995.
Schug et al., "Vacuum Ultraviolet Detector for Gas Chromatography", Analytical Chemistry, 86 (16):8329-8335, Aug. 19, 2014.

* cited by examiner

GAS CHROMATOGRAPHY WITH VACUUM ULTRA-VIOLET DETECTOR AND MASS SPECTROMETER OR ION MOBILITY SPECTROMETER

CROSS-REFERENCE TO RELATED APPLICATION

This application is a national phase filing claiming the benefit of and priority to International Patent Application No. PCT/GB2017/053122, filed on Oct. 16, 2017, which claims priority from and the benefit of United Kingdom Patent Application No. 1617460.9 filed on Oct. 14, 2016. The entire contents of these applications are incorporated herein by reference.

FIELD OF THE INVENTION

The present invention relates generally to analysis instruments and in particular to analysis instruments such as mass or ion mobility spectrometers, as well as methods of analysis using the same.

BACKGROUND

Various analysis techniques are known that may be used to provide structural or chemical information about an analyte material. For example, ultra-violet ("UV") absorption or reflectance measurements involve directing radiation in the ultra-violet spectral region onto an analyte material, whose characteristic absorption or reflectance frequencies may provide insight into the types of functional groups and structure of the analyte.

A known vacuum ultra-violet ("VUV") detector is described in "Vacuum Ultraviolet Detector for Gas Chromatography", Anal. Chem. 2014, 86, 8329-8335. Chemical compounds eluting from a gas chromatograph enter a heated transfer line maintained at e.g. 300° C. which incorporates a length of glass capillary. An analyte stream is then arranged to pass through a 10 cm path length (80 μL volume) flow cell. Following residence in the flow cell analyte is swept out through an exit vent.

However, ultra-violet spectral data can be difficult to interpret, and may not provide sufficient information to elucidate an unknown species, or confirm the presence of a target species.

It is therefore desired to provide an improved analysis instrument.

SUMMARY

According to an aspect there is provided an analysis instrument comprising:

a chromatographic or other separation device for separating gaseous analyte material according to retention time;

an ultra-violet ("UV") spectrometer or detector for obtaining ultra-violet spectral data of at least a portion of the analyte material separated in the chromatographic or other separation device; and a mass and/or ion mobility spectrometer for obtaining mass and/or ion mobility spectral data of ions generated from at least a portion of the analyte material separated in the chromatographic or other separation device.

The known arrangement described above does not disclose providing a mass and/or ion mobility spectrometer for obtaining mass and/or ion mobility spectral data of ions generated from at least a portion of the analyte material separated in the chromatographic or other separation device and does not disclose the coupling of ultra-violet absorption data with mass spectral data, The coupling of a ultra-violet spectrometer or detector with mass and/or ion mobility spectrometry and an upstream chromatographic (or other) separation enables particularly powerful combined data sets to be provided that may be used for improved elucidation of unknowns, improved confirmation of target analytes, or identification of analytes having common functional groups.

Furthermore, the resolving power of a mass and/or ion mobility spectrometer may be used to help de-convolute the ultra-violet spectral data which may otherwise be difficult when analyte material is provided to the ultra-violet spectrometer or detector from an upstream separation device due to the presence of potentially a large number of overlapping peaks. For instance, where the ultra-violet spectral data comprises such mixed data, the de-convolution may be guided based on the further separation according to mass or ion mobility in order to optimise the de-convolution process. For example, where the mass and/or ion mobility separation indicates that there are two or more species present even though these are not distinguishable in the ultra-violet spectral data (e.g. are not resolved by the upstream chromatographic or other separation), this information regarding the number, and relative proportions, of the different species may be used as input to a de-convolution algorithm in order to optimise the de-convolution of the ultra-violet spectral data.

This specific combination is especially beneficial because the information provided by the ultra-violet spectrometer or detector is highly orthogonal and highly complementary to the information provided by the mass and/or ion mobility spectrometer. The use of ion mobility separation in particular in combination with ultra-violet spectrometry (and optionally also in combination with mass separation) may assist in distinguishing very closely related species, e.g. isomers, which may otherwise be difficult to distinguish. For instance, ion mobility can separate, and identify, isomers based on their ion mobility (or collision cross section), if known. Ultra-violet spectrometry can also identify such isomers based on their characteristic spectra but can't separate them. The combination of ultra-violet and ion mobility spectrometry is therefore particularly advantageous for identifying isomers which may otherwise be difficult to distinguish e.g. using mass spectrometry, or a combination of ultra-violet and mass spectrometry alone. Also, it will be appreciated that ion mobility is therefore particularly useful in assisting in the de-convolution of mixed ultra-violet spectra containing overlapping isomers. The addition of mass separation may provide further information on the elemental composition which helps to further narrow down the possible structures that need to be considered.

In particular, the ultra-violet spectral data may provide chemical and structural information about the analyte material, which when coupled with the elemental composition information provided by mass spectral data and/or information regarding the shape and size of the analyte provided by ion mobility spectral data, and the retention time information given by the upstream chromatographic or other separation device, provides a very powerful multi-dimensional data set that can be exploited or mined in various novel ways.

It will be understood that the ultra-violet spectral range comprises wavelengths in the range from about 10 nm to 380 nm. Thus, a ultra-violet spectrometer or detector is a spectrometer or detector that operates within the ultra-violet spectral range.

The ultra-violet spectral data may comprise ultra-violet absorption, reflectance or fluorescence spectral data acquired at one or more, or one or more ranges or sub-ranges, or substantially all, frequencies within the ultra-violet spectral range.

According to various embodiments, the ultra-violet spectrometer or detector may be arranged to obtain ultra-violet spectral data at frequencies or wavelengths in the range of about 115 nm to 240 nm. According to various embodiments ultra-violet spectral data may be obtained within one or more of the following ranges namely 10-20 nm, 20-30 nm, 30-40 nm, 40-50 nm, 50-60 nm, 60-70 nm, 70-80 nm, 80-90 nm, 90-100 nm, 100-110 nm, 110-120 nm, 120-130 nm, 130-140 nm, 140-150 nm, 150-160 nm, 160-170 nm, 170-180 nm, 180-190 nm, 190-200 nm, 200-210 nm, 210-220 nm, 220-230 nm, 230-240 nm; 240-250 nm, 250-260 nm; 260-270 nm, 270-280 nm, 280-290 nm, 290-300 nm, 300-310 nm, 310-320 nm, 320-330 nm, 330-340 nm, 340-350 nm, 350-360 nm, 360-370 nm and 370-380 nm. The ultra-violet spectral data may be obtained substantially only in this range. This frequency or wavelength range may be particularly appropriate for gas phase analyte.

The analyte material may be separated in a chromatograph or other separation device such that different components of the analyte material may sequentially elute or exit from the chromatograph or other separation device according to their characteristic retention time or time interval. Thus, analyte material eluting from or exiting the chromatograph or other separation device may have a characteristic associated retention time. The chromatograph or other separation device allows for a pre-separation of the analyte material, prior to its further analysis and/or separation in the ultra-violet spectrometer or detector and/or the mass and/or ion mobility spectrometer, The ultra-violet spectrometer or detector may be located downstream of the chromatograph or other separation device such that the analyte material is separated prior to its arrival at the ultra-violet spectrometer or detector. That is, the analyte material may pass through at least a portion of the chromatograph or other separation device prior to obtaining the ultra-violet spectral data of the analyte material. Ultra-violet spectral data may thus be obtained after the analyte material has been at least partially separated by the chromatograph or other separation device according to a physico-chemical property. Thus, the ultra-violet spectrometer or detector may be positioned at an output of the chromatograph or other separation device.

The ultra-violet spectral data may comprise one or more ultra-violet spectra, such as a plurality of ultra-violet spectra. Each ultra-violet spectrum may be associated with a corresponding retention time according to the upstream separation in the chromatograph or other separation device, That is, each ultra-violet spectrum or group of spectra may be labelled with a corresponding retention time or time interval. Thus, each ultra-violet spectrum may be associated using retention times with the analyte material that is present or eluting at that retention time.

Similarly, the ion source (where one is provided), and the mass and/or ion mobility spectrometer, may be located downstream of the chromatograph or other separation device such that the analyte material is separated prior to arrival at the ion source and/or prior to its subsequent mass and/or ion mobility analysis.

The mass and/or ion mobility spectral data may thus be obtained after the analyte material has been at least partially separated by the chromatograph or other separation device. Thus, the ion source may be positioned at an output of the chromatograph or other separation device. Alternatively, or additionally, the ion source may be positioned at an output, or downstream, of the ultra-violet spectrometer or detector. The mass and/or ion mobility spectral data may typically comprise one or more mass and/or ion mobility spectra, such as a plurality of mass and/or ion mobility spectra. That is, each mass and/or ion mobility spectrum or group of spectra may be labelled with a corresponding retention time or time interval. Each mass and/or ion mobility spectrum may be associated using retention times with the analyte material that is present or eluting at that retention time.

In this way, the ultra-violet spectral data may also be directly associated with the mass and/or ion mobility spectral data obtained at substantially the same time. A multi-dimensional data set may thus be generated with each data point (or subset of data points) in the multi-dimensional data set associated with a value (or range of values) of: retention time; ultra-violet detector frequency/wavelength; mass or mass to charge ratio and/or ion mobility or collision cross section; and optionally intensity, The analyte material may be gaseous. For instance, the analyte material may be provided to or from the chromatographic or other separation device in the gas phase and/or the analyte material may be analysed in the ultra-violet spectrometer or detector in the gas phase.

The chromatographic or other separation device may comprise a gas chromatograph.

The chromatograph or other separation device may comprise other gas phase separation devices.

However, it is also contemplated that the chromatograph or other separation device may comprise a liquid chromatography device, provided that a suitable liquid phase ultra-violet spectrometer or detector is provided, or provided that the analyte material is converted into the gas phase prior to analysis (where a gas phase ultra-violet spectrometer or detector is provided). Alternatively, the separation device may e.g. comprise: (i) a Capillary Electrophoresis ("CE") separation device; (ii) a Capillary Electrochromatography ("CEG") separation device; (iii) a substantially rigid ceramic-based multilayer microfluidic substrate ("ceramic tile") separation device; or (iv) a supercritical fluid chromatography separation device, The ultra-violet spectrometer or detector may comprise a flow cell vacuum ultra-violet ("VUV") absorption detector.

It will be appreciated that the ultra-violet spectrometer or detector is generally a gas-phase spectrometer or detector. Typically, ultra-violet spectrometer or detectors are non-destructive to analyte material. The ultra-violet spectrometer or detector need not comprise an absorption detector, and it is also contemplated that the ultra-violet spectrometer or detector may e.g. comprise a fluorescence or reflectance spectrometer.

The instrument may further comprise a data recording system for recording one or more multi-dimensional data sets comprising the ultra-violet spectral data and the mass and/or ion mobility spectral data arranged according to retention time.

The ultra-violet spectral data obtained at a particular (retention) time may be associated with the mass and/or ion mobility spectral data obtained at the same (retention) time. The timescales for recording the ultra-violet and mass and/or ion mobility spectral data may be much shorter than the characteristic timescales of the chromatograph or other separation device, such that typically many ultra-violet and mass and/or ion mobility spectra may be obtained during the course of a single separation, with each spectrum or group of spectra being associated with a corresponding retention time. The instrument, or particularly the data recording system of the instrument, or some other data processing system associated with the instrument, may account e.g. for transit times of analyte material through the instrument (e.g. transit times of ions through the vacuum stages of the mass and/or ion mobility spectrometer) in order to correctly align the ultra-violet and mass and/or ion mobility spectra in retention time. However, again, these timescales are relatively short, and this adjustment may not be necessary.

The data recording system may, for example, comprise one or more data recording media and one or more processors. The data recording system may comprise an external computer, or a computer that is built-in to the instrument, or some combination where processing and data recordal is shared between various components of the system.

The mass and/or ion mobility spectrometer (or other analytical instrument) may be located downstream of the ultra-violet spectrometer or detector such that analyte material is caused to pass from the ultra-violet spectrometer or detector to an inlet of the mass and/or ion mobility spectrometer for subsequent mass and/or ion mobility analysis.

The ultra-violet spectrometer or detector may be located in line between the chromatograph or other separation device and an inlet of (or leading into) the mass and/or ion mobility spectrometer. In this way, analyte material may be passed directly from the ultra-violet spectrometer or detector to the inlet such that the same analyte material (i.e. or ions derived from the same analyte material) analysed by the ultra-violet spectrometer or detector is subsequently analysed by the mass and/or ion mobility spectrometer. The mass and/or ion mobility spectral data may thus be directly and simultaneously associated with the ultra-violet spectral data. The inlet may comprise an ion source for generating ions from the analyte material.

The instrument may further comprise an ion source for generating ions from at least a portion of the analyte material separated in the chromatographic or other separation device, wherein the ion source is located downstream of the ultra-violet spectrometer or detector and upstream of the mass and/or ion mobility spectrometer (or other analytical instrument).

Thus, the ion analysis instrument may comprise: a chromatograph or other separation device for separating analyte material according to retention time; a ultra-violet spectrometer or detector for obtaining ultra-violet spectral data of at least a portion of the analyte material separated in the chromatograph or other separation device; an ion source for generating ions from at least a portion of the analyte material separated in the chromatograph or other separation device; and a mass and/or ion mobility spectrometer for obtaining mass and/or ion mobility spectral data of the ions.

Additionally, or alternatively, at least a portion of the analyte material may be ionised within or by the ultra-violet spectrometer or detector.

For instance, the ultra-violet radiation may cause some analyte material to ionise, or may cause some analyte material to become excited such that it may subsequently ionise via collisions within or downstream of the ultra-violet spectrometer or detector. These collisions may be with other gas or analyte molecules, or with one or more surfaces of or within the ultra-violet spectrometer or detector, or one or more surfaces downstream of the ultra-violet spectrometer or detector. In this case, where the ultra-violet spectrometer or detector is located upstream of the inlet of the mass and/or ion mobility spectrometer, the ions generated in or by the ultra-violet spectrometer or detector may be directly analysed by the mass and/or ion mobility spectrometer (i.e. without necessarily requiring any further ionisation). In this case, the inlet may simply comprise a sampling orifice for sampling or otherwise receiving analyte material and/or ionised analyte material. The inlet may further comprise suitable transfer components for directing the (ionised) analyte material into the vacuum stages of the mass spectrometer and/or ion mobility spectrometer. For example, the instrument may comprise a heated transfer line between the ultra-violet spectrometer or detector and an inlet of the ion source for transferring analyte material from the ultra-violet spectrometer or detector to the ion source and/or to the inlet of the mass and/or ion mobility spectrometer.

It will be appreciated that ions may be generated through a combination of ionisation or photo-ionisation within or by the ultra-violet spectrometer or detector and ionisation of any remaining neutral molecules (or further ionisation of any ions) by an ion source.

Alternatively, or additionally, a first portion of the analyte material separated in the chromatographic or other separation device may be directed to the ultra-violet spectrometer or detector and a second portion of the analyte material separated in the chromatographic or other separation device may be directed to an ion source located upstream of the mass and/or ion mobility spectrometer.

In this case, the ultra-violet spectrometer or detector and the mass and/or ion mobility spectrometer may be arranged to generate spectra substantially simultaneously or in parallel. The analyte material may be split between the ultra-violet spectrometer or detector and the mass and/or ion mobility spectrometer according to a pre-determined or data dependent split ratio. The split ratio may be determined based on the relative sensitivities of the ultra-violet spectrometer or detector and the mass and/or ion mobility spectrometer.

The ion source may generally comprise an atmospheric pressure ionisation source, such as: (i) a corona discharge ionisation source; (ii) an atmospheric pressure chemical ionisation source; (iii) a glow discharge ionisation source; (iv) a direct analysis real-time ("DART") ionisation source; or (v) a secondary electrospray ionisation source.

Alternatively, or additionally, the ion source may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source;

(xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) Surface Assisted Laser Desorption Ionisation ("SALDI"). The ion source may comprise one or more continuous or pulsed ion sources.

Ions may also be formed within the ultra-violet spectrometer or detector, and where the ultra-violet spectrometer is positioned in line between the chromatograph or other separation device and the mass and/or ion mobility spectrometer, these ions may be passed to the mass and/or ion mobility spectrometer for analysis.

According to another aspect there is provided a method of analysis comprising:

separating gaseous analyte material according to retention time using a chromatographic or other separation device;

obtaining ultra-violet ("UV") spectral data of at least a portion of the analyte material separated in the chromatographic or other separation device using a ultra-violet spectrometer or detector;

ionising at least a portion of the analyte material separated in the chromatographic or other separation device; and obtaining mass and/or ion mobility spectral data of the ionised analyte material.

The method may further comprise obtaining one or more multidimensional data sets comprising the ultra-violet spectral data and the mass and/or ion mobility spectral data arranged according to retention time.

The method may comprise comparing the multidimensional data set, or at least a subset of values from the multidimensional data set, with respective data values contained within a library to identify and/or characterise one or more components of the analyte material.

The combined multidimensional data obtained according to the techniques described herein may be highly characteristics of a particular compound of species. Thus, a library containing ultra-violet spectral, mass and/or ion mobility and/or retention time data for one or more known ions may be constructed, such that the obtained multidimensional data may then be compared with the values stored in the library to help identify or confirm the identity of target ions within the analyte material. Particularly where the analyte material is a complex mixture this may help to reduce false positives.

For each compound or species included in the library, a set of values of any or all of its characteristic retention time, characteristic ultra-violet spectral data (e.g. frequencies or wavelengths), characteristic mass or mass to charge ratios and/or ion mobilities or collision cross sections may be stored. The comparison between the obtained multidimensional data and the library may thus be made using any or all of these characteristic values. For example, where the obtained multidimensional data comprises ultra-violet spectral frequencies or wavelengths and mass or mass to charge ratios aligned according to retention time, a comparison may be made between the values of retention time, ultra-violet frequency or wavelength and mass or mass to charge ratios obtained within the multidimensional data set and the values of retention time, ultra-violet frequency or wavelength and mass or mass to charge ratios contained within the library. Where the, or at least some of the, obtained values match within a certain tolerance those contained within the library for a particular species, this indicates that the species may be present in the analyte mixture. Thus, the library comparison may provide additional confirmation of the presence or identity of an ion. The obtained ultra-violet spectral data may also, or alternatively, be used by itself for screening of samples to identify one or more, and preferably a plurality of, compounds within the sample. That is, the ultra-violet spectral data may be compared with a library of known ultra-violet spectra in order to identify or characterise one or more compounds within a sample on the basis of the obtained ultra-violet spectral data substantially matching the ultra-violet spectral data for a corresponding entry within the library.

The method may comprise:

extracting one or more signals from the ultra-violet spectral data corresponding to one or more wavelengths of interest;

determining a retention time(s) associated with the one or more signals; and extracting one or more mass and/or ion mobility spectra obtained at the determined retention time(s) from the mass and/or ion mobility spectral data.

The wavelengths or frequencies of interest may be pre-selected, or may be determined dynamically or in a data dependent fashion. The selected wavelengths or frequencies may e.g. correspond to wavelengths or frequencies that are characteristic of or associated with one or more specific or targeted chemical structures or functional groups. In this way, classes of samples showing similar chemical structures may be isolated. Thus, the method may comprise a step of determining or isolating classes of samples showing similar chemical structures (e.g. using the extracted signals and/or spectra). The signals may generally be chromatographic signals. For example, the extracted signals may comprise a trace of intensity against retention time for the selected wavelengths. The retention time(s) associated with the one or more signals may therefore correspond to retention time peaks or other regions of interest obtained from the chromatographic signals.

The method may further comprise:

extracting one or more signals from the mass and/or ion mobility spectral data corresponding to a mass, mass to charge ratio and/or ion mobility value or range of values of interest;

determining a retention time(s) associated with the one or more signals; and extracting one or more ultra-violet spectra obtained at the determined retention time(s) from the ultra-violet spectral data.

In this way, ultra-violet spectral data may be used to confirm the identity of a target ion, selected on the basis of mass, mass to charge ratio and/or ion mobility. Thus, the method may comprise a step of determining or identifying a target ion (e.g. using the extracted signals and/or spectra). The signals may generally be chromatographic signals. For example, the extracted signals may comprise a trace of intensity against retention time for the selected mass, mass to charge ratio and/or ion mobility value(s). That is, the extracted signals may comprise mass or ion mobility chromatograms. The retention time(s) associated with the one or more signals may therefore correspond to retention time peaks or other regions of interest from the chromatographic signals.

The obtained ultra-violet spectral data may be used to trigger a targeted mass and/or ion mobility analysis. That is, the ultra-violet spectral data may be used in a data dependent manner to direct or control an operation of the mass and/or ion mobility spectrometer. For example, the ultra-violet spectral data may be used to trigger a tandem or MS/MS measurement, where a specific mass or mass to charge ratio value (or range of values) is isolated and a fragmentation or product ion spectra obtained for the selected mass or mass to charge ratio value (or range of values). The mass and/or ion mobility spectral data may also be used, in conjunction with the ultra-violet spectral data or alone, in a similar data dependent manner. Indeed, in general, the mass and/or ion mobility spectrometer may be operable in a plurality of operating (or analysis) modes wherein the operating mode of the mass and/or ion mobility spectrometer may be selected or controlled based on the obtained ultra-violet spectral data. That is, the analysis mode of the mass and/or ion mobility spectrometer may be switched based on the obtained ultra-violet spectral data, e.g, to tailor or optimise the analysis accordingly based on the ultra-violet spectral data.

The method may comprise using the mass and/or ion mobility spectral data to assist in de-convoluting the ultra-violet spectral data. Similarly, the instrument may be provided with suitable means such as one or more processors or processing units for de-convoluting the ultra-violet spectral data using the mass and/or ion mobility spectral data. In particular, it will be appreciated that in some cases the obtained ultra-violet spectral data may be mixed, and may contain multiple overlapping peaks. In this case, the data can be difficult to de-convolute, as various assumptions have to be made e.g., as to the number of species. By providing a further stage of separation it is possible to determine information on the number of species present, and this may in turn be used to optimise the de-convolution of the ultra-violet spectral data.

The method may comprise adding one or more compounds having characteristic ultra-violet absorption signatures to the analyte material prior to obtaining the ultra-violet spectral data. For example, this method may find particular utility where it is desired to screen for a specific compounds or set of compounds of interest such as, among other applications, on-site testing, e.g. at airport security.

The one or more compounds may comprise an ion mobility spectrometry ("IMS") shift reagent.

According to another aspect there is provided an analysis instrument comprising:
a chromatographic or other separation device for separating analyte material according to retention time;
a non-destructive spectrometer or detector for obtaining first spectral data of at least a portion of the analyte material separated in the chromatographic or other separation device; and
a mass and/or ion mobility spectrometer for obtaining mass and/or ion mobility spectral data of ions generated from at least a portion of the analyte material separated in the chromatographic or other separation device.

It should be understood that it is not essential that analyte material is separated in the gas or gaseous phase. For example, further embodiments are contemplated wherein analyte material may be separated in the liquid phase.

According to another aspect there is provided an analysis instrument comprising:
a chromatographic or other separation device for separating analyte material according to retention time;
a non-destructive spectrometer or detector for obtaining first spectral data of at least a portion of the analyte material separated in the chromatographic or other separation device; and
a mass and/or ion mobility spectrometer for obtaining mass and/or ion mobility spectral data of ions generated from at least a portion of the analyte material separated in the chromatographic or other separation device.

According to another aspect there is provided a method of analysis comprising:
separating analyte material according to retention time using a chromatographic or other separation device;
obtaining first spectral data of at least a portion of the analyte material separated in the chromatographic or other separation device;
ionising at least a portion of the analyte material separated in the chromatographic or other separation device; and
obtaining mass and/or ion mobility spectral data of the ionised analyte material.

Hence according to various further embodiments there may be provided an analysis instrument having any, or all, of the features described herein in relation to any of the other embodiments or aspects substantially described herein. Similarly, the analysis instrument of this aspect may be arranged or operated according to any of the methods substantially as described herein.

In particular, it is contemplated that analyte material may be separated using a liquid chromatography ("LC") separation device or a capillary electrophoresis ("CE") separation device optionally in combination with an ultra-violet ("UV") spectrometer or detector.

According to another aspect there is provided a mass spectrometer system comprising:
a gas chromatography column configured to separate and deliver at least one gaseous analyte;
a gas phase ultra-violet absorption flow cell spectrometer/detector downstream of the gas chromatograph;
an atmospheric pressure ion source downstream of the ultra-violet spectrometer; and
an ion mobility spectrometry ("IMS") and/or mass to charge ratio separator or filter downstream of the ion source.

According to various embodiments analytes eluting from the gas chromatograph pass through the ultra-violet spectrometer producing a ultra-violet absorption spectrum and then pass into the atmospheric pressure ionisation ("API") ion source where remaining neutral molecules are ionised and sampled into a mass spectrometer vacuum system for subsequent ion mobility spectrometry ("IMS") and/or mass to charge ratio analysis.

The vacuum ultra-violet ("VUV") light source may produce ions which are directly sampled into the mass spectrometer.

The ion source may comprise a corona discharge ("APCI") or glow discharge or a direct analysis real-time ("DART") ionisation source or secondary electrospray ionisation.

Multi-dimensional data sets comprising absorption wavelength or frequency, mass to charge ratio and/or collision cross section may be produced and may be aligned in retention time or other parameter or physico-chemical property.

It is believed that the combination of ultra-violet spectral data and mass and/or ion mobility spectral data may be advantageous in its own right. Thus, from a further aspect there is provided a method of analysis comprising: passing analyte material to an ultra-violet spectrometer or detector and obtaining ultra-violet ("UV") spectral data of the analyte material; ionising at least a portion of the analyte material; and obtaining mass and/or ion mobility spectral data of said ionised analyte material. There is also provided an ion analysis instrument comprising a ultra-violet spectrometer or detector and a mass and/or ion mobility spectrometer or separator.

These components may be arranged similarly as described above in relation to the previous aspects and embodiments.

Indeed, these aspects may generally be combined with any of the features described above in relation to the previous aspects and embodiments.

For instance, the method may further comprise using the mass and/or ion mobility spectral data to assist in de-convoluting the ultra-violet spectral data. Furthermore, the method may comprise adding one or more compounds having characteristic ultra-violet absorption signatures to said analyte material prior to obtaining the ultra-violet spectral data. The one or more compounds comprise an ion mobility spectrometry ('IMS") shift reagent. The method may also comprise comparing the obtained ultra-violet spectral data and the ion mobility and/or mass spectral data with library data to confirm the presence of targeted species. The combination of ultra-violet spectral data with ion mobility and/or mass spectral data may help to further eliminate false positives. For example, the combination of techniques may help to give a high level of specificity and allow a targeted species to be confirmed or rejected even where none of the techniques individually would give enough specificity to provide such a determination. As mentioned above, the combination of ultra-violet and ion mobility spectral information in particular may provide various advantages in the analysis of complex samples containing a number of overlapping isomeric species, which would otherwise be difficult to identify.

The method in accordance with any of the aspects of embodiments described above may be performed using an instrument substantially as described herein.

The instrument may further comprise various ion guiding, transfer or manipulation devices located between the ion source and the mass and/or ion mobility spectrometer.

For instance, the instrument may comprise one or more ion guides.

The instrument may comprise one or more ion mobility separation devices and/or one or more Field Asymmetric Ion Mobility Spectrometer devices.

The instrument may comprise one or more ion traps or one or more ion trapping regions.

The instrument may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultra-violet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("BD") fragmentation device.

The ion-molecule reaction device may be configured to perform ozonolysis for the location of olefinic (double) bonds in lipids.

The instrument may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The instrument may comprise one or more energy analysers or electrostatic energy analysers.

The instrument may comprise one or more ion detectors.

The instrument may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The instrument may comprise a device or ion gate for pulsing ions; and/or a device for converting a substantially continuous ion beam into a pulsed ion beam.

The instrument may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The instrument may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The instrument may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation. The data dependent analysis may be trigged based on the obtained ultra-violet spectral data and/or based on the obtained mass and/or ion mobility spectral data, as described herein,

BRIEF DESCRIPTION OF THE DRAWINGS

Various embodiments will now be described, by way of example only, and with reference to the accompanying drawings in which.

DETAILED DESCRIPTION

Figure 1:
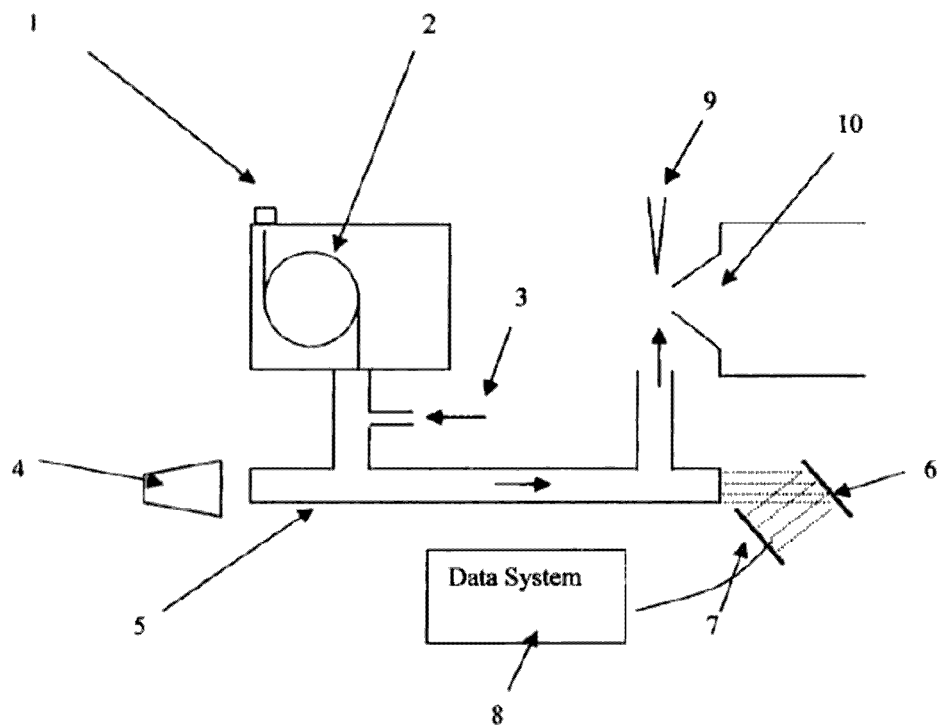
FIG. 1 shows schematically a combined gas chromatography vacuum ultra-violet ("GC-VUV") mass spectrometry apparatus according to an embodiment.

A first example of a combined gas chromatography vacuum ultra-violet ("GC-VUV") mass spectrometry apparatus according to various embodiments is shown schematically in FIG. 1.

As shown in FIG. 1, a sample of analyte material is injected into an inlet 1 of a gas chromatograph 2 and is separated in a known manner, such that the separated analyte material elutes from the gas chromatograph 2 according to its retention time. The substantially continuous stream of material eluting from the gas chromatograph 2 may then be mixed with a make-up flow of gas 3 before it is directed into a vacuum ultra-violet ("VUV") absorption flow cell 5 wherein the gaseous analyte material may be illuminated with ultra-violet radiation from a ultra-violet lamp 4 or other source of ultra-violet radiation. Ultra-violet radiation emitted from the ultra-violet lamp 4 is passed through the flow cell and may be directed by suitable optics 6 onto a charged coupled device ("CCD") detector 7, the output of which may be connected to a data system 8.

The ultra-violet radiation emitted by the ultra-violet lamp 4 (or other ultra-violet radiation source such as a laser) may interact with gaseous analyte material within the flow cell and the data system 8 is thus able to record ultra-violet absorption spectra for the analyte material. The typical timescale for recording a ultra-violet absorption spectrum is much shorter than the characteristic timescale of separation in the gas chromatograph 2, such that a large number of ultra-violet absorption spectra may be acquired throughout the separation. Each ultra-violet absorption spectrum may thus be associated with a particular retention time or time interval i.e. each ultra-violet absorption spectrum may be associated with the components of analyte material eluting from the chromatograph 2 at that time.

Various suitable vacuum ultra-violet ("VUV") spectrometers or detectors for gas chromatography are available, for instance, from VUV Analytics, Inc. of Austin, Tex. One suitable vacuum ultra-violet ("VUV") detector is described in "Vacuum Ultraviolet Detector for Gas Chromatography", Anal. Chem. 2014, 86, 8329-8335. However, a person skilled in the art will appreciate that various other ultra-violet spectrometers or detectors may also suitably be used. For instance, a fluorescence or reflectance ultra-violet spectrometer or detector may be used instead of an absorption spectrometer.

In general, detection limits on the order of 100 pg on column are readily achievable using an ultra-violet detector and absorption spectra may be produced at 30-100 times per second over a wavelength range of 115-240 nm. This is much faster than typical chromatography timescales where e.g. a sample may be separated over a period of about 30 minutes. The ultra-violet spectrum between 115-240 nm, in particular, is very highly featured, e.g. compared to typical liquid phase ultra-violet spectra, and can therefore be used to differentiate between many compounds. Furthermore, the response is quantitative to 3-4 orders of magnitude. The ultra-violet spectrometer may, therefore, acquire one or more ultra-violet spectra in the range of 115 to 240 nm. The ultra-violet spectrometer may acquire the ultra-violet spectra only in this range, or may also acquire ultra-violet or other spectra in a broader or different range(s).

The ultra-violet detector 7 may be non-destructive in relation to the analyte and hence analyte passing through the flow cell 5 may therefore be subject to further downstream analysis. Thus, as shown in FIG. 1, analyte material exiting the flow cell 5 may be directed via a suitable transfer line to an inlet of an ion source 9. The analyte material, including any surviving neutral molecules, may then be ionised by the ion source 9 ready for subsequent mass spectrometric or ion mobility analysis by an analytical instrument 10. The transfer line may be heated (e.g., to 300° C.) to facilitate transfer of analyte material towards the ion source.

FIG. 1 illustrates an atmospheric pressure ionisation ("API") source in the form of an atmospheric pressure chemical ionisation ('APCI") source comprising a corona discharge needle 9. The corona discharge needle 9 produces reagent ions that result in the ionisation of neutral analyte molecules arriving at the ion source 9. However, it is contemplated that various other suitable ion sources, particularly various other suitable atmospheric pressure ionisation sources may also be used and the techniques described herein are not particularly limited in this respect. For example, the ion source may comprise various types of glow discharge ion sources, a direct analysis real-time ("DART") ion source or a secondary electrospray ionisation source, or various other suitable ion sources.

The ions generated in the ion source 9 (along with any ions already present within the gaseous analyte material, such as those that may be formed due to ionisation or photo-ionisation by the ultra-violet radiation in the flow cell 5) are then sampled or otherwise arranged to enter the vacuum stages of a mass and/or mobility spectrometer 10. The ions may be transmitted downstream through various analytical filtering or separation devices of the mass and/or ion mobility spectrometer 10, such that one or more mass and/or ion mobility spectra are obtained. The mass and/or ion mobility spectrometer 10 may comprise a mass and/or ion mobility spectrometer of various known types, and the one or more mass and/or ion mobility spectra may be obtained using any suitable mass and/or ion mobility analyser. For example, a mass spectrometer 10 may comprise one or more time of flight ("TOF") mass analysers for obtaining one or more mass spectra. Other examples of suitable mass analysers include quadrupole mass filters or analysers, RF-confined or electrostatic ion traps, etc. An ion mobility spectrometer 10 may comprise one or more ion mobility or differential ion mobility filters or separation devices, such as a drift tube, travelling wave, field-assisted, or drift gas-assisted ion mobility separation device for obtaining one or more ion mobility spectra. As well as recording the mass and/or ion mobility spectra, the spectrometer 10 may be arranged to further process or manipulate the ions, e.g. by subjecting them to various fragmentation or reaction processes such as electron transfer dissociation ("ETD"), electron capture dissociation ("ECD"), collision induced dissociation ("CID") or surface induced dissociation ("SID"). In this way, the spectrometer 10 may be used to obtain mass and/or ion mobility spectra of product or fragment ions derived from the initial ions generated from the analyte material. These product, daughter or fragment ions may be characteristic of a loss of a particular group from the molecular ion, and may therefore be used to help identify or confirm the presence of a particular species.

The timescales for transmitting the ions through the spectrometer 10 and recording the mass and/or ion mobility spectra are relatively short, at least compared to the chromatography timescales, such that multiple mass and/or ion mobility spectra may be obtained during the course of a chromatographic separation and each mass and/or ion mobility spectrum may be associated with a particular retention time or time interval. The mass and/or ion mobility spectra may thus also be associated with the ultra-violet or other spectra acquired at substantially the same retention time (potentially after accounting for any transit time of ions through the vacuum stages of the spectrometer 10, etc.)

Thus, by coupling the output of a vacuum ultra-violet ("VUV") detector flow cell 5 directly to the ion source of a mass and/or ion mobility spectrometer 10, the apparatus is capable of generating multi-dimensional data sets comprising both vacuum ultra-violet ("VUV") absorption spectral data and also mass and/or ion mobility spectral data, wherein the data sets can be aligned according to the retention time of ions exiting the gas chromatograph 2. The combined data may therefore include, for each retention time, both the ultra-violet absorption spectrum and the mass and/or ion mobility spectrum for the analyte material that is present at that time. It will be appreciated that such a combined multi-dimensional data set is particularly beneficial.

If the spectrometer 10 comprises a mass spectrometer, then the instrument may be used to record four dimensional data sets wherein the ultra-violet detector frequencies/wavelength, mass to charge ratio and intensity are recorded at each retention time by aligning the ultra-violet spectra recorded at each retention time with the peaks recorded by the mass spectrometer at substantially the same retention time. Each recorded interval in retention time may thus be associated with both the corresponding ultra-violet spectra and the corresponding mass spectra.

This combination has been found to provide a particularly powerful analysis technique, as the ultra-violet spectral data is highly orthogonal and complementary to the mass spectral data.

The combined multi-dimensional data comprising both ultra-violet and mass spectral data therefore provides highly useful information about the analyte species, beyond what could be provided by either technique alone. For instance, ultra-violet spectral data typically provides information regarding the type of functional groups present on the analyte species, as well as insight into the structure of the analytes. On the other hand, the mass spectral data may contain information about the elemental composition of the analyte (e.g. determined from accurate mass measurements), or information about characteristic product ions (e.g. determined by fragmenting or reacting the ions, using various known tandem MS or $MS^e$ analysis techniques). Coupling the ultra-violet spectral information with mass spectral information thus results in a highly useful combined data set, which may subsequently be mined in various novel ways e.g, in order to provide an improved recognition of target analytes and/or an improved identification of unknown analytes.

For example, a library may be constructed including the values of retention time, mass (and/or ion mobility or CCS), ultra-violet spectral frequency or wavelength associated with one or more particular ions. The combined multi-dimensional data (that is, at least a subset of values from the multi-dimensional data set) may be compared with the library to help identify the presence of one or more target ions (included in the library). The library may thus be used for extra confirmation of the identity of certain ions within a complex mixture, e.g, to reduce false positives.

As another example, in one approach, chromatographic signals arising from ultra-violet absorption data at a specific target wavelength, corresponding to a specific target chemical and/or structural configuration, may be extracted from the ultra-violet spectral data. These chromatographic signals may thus contain a number of retention time peaks, or other regions of interest, that reflect the (retention) times at which target analyte material having the specific chemical and/or structural configuration are present. The peaks, or other regions of interest, may then be associated with the corresponding retention time regions in the mass spectral data, so that the corresponding mass spectra for the target analyte material can be extracted. This approach may allow classes of samples showing similar chemical structure to be isolated or identified.

In another approach, one or more chromatograms may be generated from the mass spectral data. For instance, one or more mass chromatograms corresponding to one or more target ions having a specific mass or mass to charge ratio may be generated. The ultra-violet spectra obtained at the same retention time(s) as the ions of interest may then be used to help confirm the identity of the target ion with a greater confidence than identification by mass or mass to charge ratio alone. For example, characteristic product ions for a particular class of compounds may be targeted using a mass spectrometer and ultra-violet detector data from the associated retention time may be used to confirm the identity of the target analyte.

In another example, the spectrometer 10 may comprise an ion mobility spectrometer, and the instrument may thus be used to record four dimensional data sets wherein the ultra-violet detector frequency or wavelength, ion mobility and intensity are recorded at each retention time. Furthermore, the spectrometer 10 may comprise a hybrid ion mobility-mass spectrometer. For instance, ion mobility separation may be combined with mass spectrometry in a nested acquisition, in which case the instrument may be used to record five dimensional data sets (retention time, ultra-violet frequencies/wavelengths, ion mobility or collision cross section, mass or mass to charge ratio and intensity), allowing even more novel data mining opportunities and even higher specificity in identification of compounds.

Ion mobility measurements may reflect the physical size and shape of the analyte ions. For instance, ion mobility measurements may measure the collision cross section of the analyte ions. Coupling the ultra-violet spectrometer with an ion mobility spectrometer thus allows information about the physical size and shape of the analyte ions to be recorded along with the ultra-violet spectral data, Again, it will be appreciated that the ultra-violet spectral data is highly complementary to the ion mobility spectral data, and the combined multi-dimensional data set may thus be processed using similar approaches to those discussed above in relation to the combined UV-mass spectral data.

Where an ion mobility separator is provided, ion mobility shift reagents may be added to the analyte material. Shift reagents having a characteristic ultra-violet absorption signature may be used such that the presence of the shift reagents in the ultra-violet spectra may be readily determined.

Similarly, specific chromophores may be added to the analyte material either during derivatisation (i.e. prior to the gas chromatographic separation) or during the gas phase. These may assist in targeting specific compounds by ultra-violet spectrometry. For example, the derivatives may have specific characteristic fragment ions which can be used to correlate with signals in the ultra-violet spectral data, adding further specificity to the analysis.

Although rich in structural information, ultra-violet spectral data may be difficult to de-convolute, especially where there are many overlapping peaks due to multiple species eluting from the chromatograph at substantially the same time. Thus, it can be difficult to obtain pure absorption spectra suitable for library matching using GC-VUV techniques. Accordingly, in a further approach, the separation power of the mass and/or ion mobility spectrometer or the specificity of MS/MS fragmentation data may be harnessed to assist in de-convolution of ultra-violet spectral data. For example, reconstructed mass chromatograms may be used to determine the number of co-eluting species at a given retention time as well as the relative intensities and retention times. This information may then be used in de-convolution of the ultra-violet spectra.

The ultra-violet detector data may also be used, alone or in combination with other mass and/or ion mobility data, to trigger targeted MS/MS data acquisition i.e. in a data dependent mode of operation. For example, where the ultra-violet and/or mass or ion mobility spectral data indicates the potential presence of a target species of interest, the instrument may then be arranged to acquire a fragment or product ion mass spectrum of that species to confirm its presence/identity.

Figure 2:
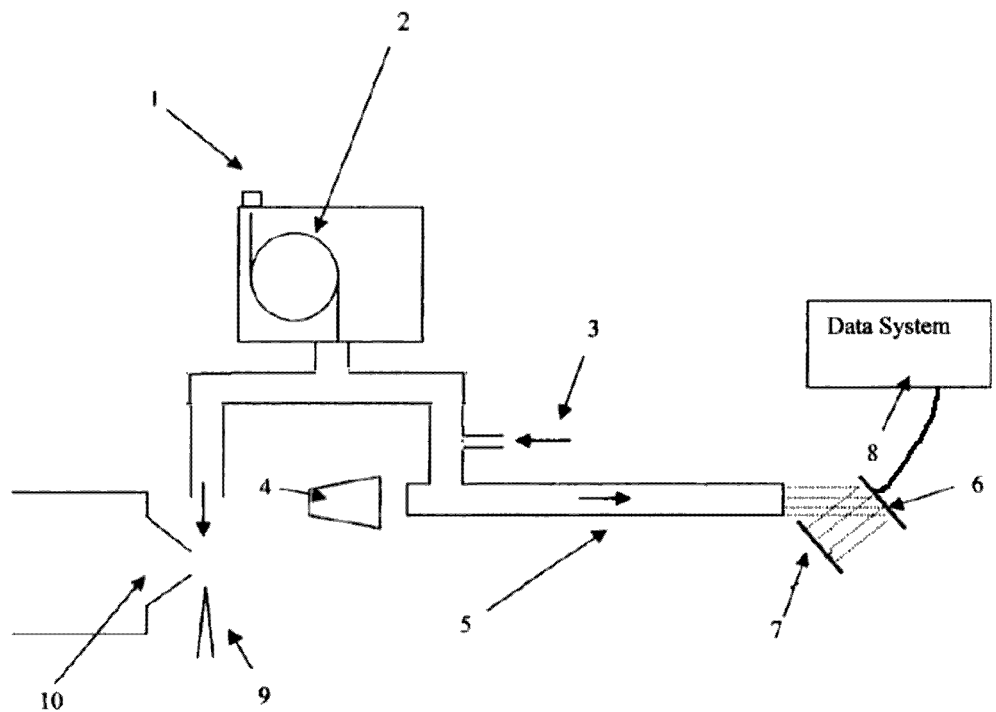
FIG. 2 shows schematically another combined gas chromatography vacuum ultra-violet ("GC-VUV") mass spectrometry apparatus according to another embodiment.

A second example of a combined GC-VUV mass spectrometry apparatus is shown schematically in FIG. 2. The components shown in FIG. 2 may generally be the same or similar to those described above, including those shown in FIG. 1, and like reference numerals are therefore used to identify like components. In the FIG. 2 apparatus, by contrast to the configuration shown in FIG. 1 where the vacuum ultra-violet ("VUV") flow cell 5 is located in line between the gas chromatograph 2 and the ion source of the mass and/or ion mobility spectrometer 10, analyte material eluting from the gas chromatograph 2 is split such that a first portion of the analyte material is directed to the ion source 9 and subsequently to the mass and/or ion mobility spectrometer 10 whereas a second portion of the analyte material is directed to an ultra-violet flow cell 5. The analyte material may be split into two streams with a predetermined or data dependent split ratio.

In the FIG. 2 configuration, it will be appreciated that neither the ultra-violet spectrometer 5 nor the mass and/or ion mobility spectrometer 10 receives the entire population of analyte material, such that the absolute sensitivity of both spectrometers may be reduced. On the other hand, the embodiment shown in FIG. 2 allows the relative proportions of analyte material directed to the different spectrometers to be varied such that, for example, if the mass and/or ion mobility spectrometer 10 is more sensitive than the ultra-violet spectrometer 5, then more analyte material may be directed to the ultra-violet spectrometer 5 in order to compensate for the difference such that all analytes have similar detection limits (in terms of the total amount injected on column) on both detectors.

Furthermore, in some cases, the vacuum ultra-violet ("VUV") lamp 4 or other source of ultra-violet radiation may potentially ionise some of the analyte material within the flow cell 5. Where the analyte material is arranged to pass directly from the flow cell 5 into the mass and/or ion mobility spectrometer, as shown in FIG. 1, this could result in a loss of sensitivity, e.g. as a result of neutralization of ions within or at the exit of the flow cell 5. Splitting the analyte material eluting from the gas chromatograph 2 and running the ultra-violet spectrometer and mass and/or ion mobility spectrometer 10 in parallel may help to reduce this potential loss of sensitivity.

In the FIG. 2 configuration, the two spectrometers may run essentially simultaneously and in parallel, so that the data from the two spectrometers may still be associated or aligned in retention time to generate a multi-dimensional data set containing e.g. retention time; ultra-violet frequency/wavelength; mass or mass to charge ratio and/or ion mobility or collision cross section; and optionally intensity. The resulting data may thus also be mined in a similar manner using the same approaches described above in relation to FIG. 1.

Although FIGS. 1 and 2 both show a dedicated ion source, as mentioned above, ions may also be generated in or due to the ultra-violet flow cell 5. For instance, the energy provided by the ultra-violet radiation may be sufficient to cause ions to ionise, or may sufficiently excite ions such that they subsequently ionise through collisions within the ultra-violet flow cell, or e.g. within the transfer line, or with a dedicated collision surface provided downstream of the ultra-violet flow cell. Thus, where the ultra-violet flow cell is arranged in line between the chromatographic or other separation device and the mass and/or ion mobility spectrometer, such as in the FIG. 1 arrangement, it may also be possible to directly analyse the ions generated in or by the ultra-violet flow cell 5. In this case, it will be appreciated that a dedicated ion source need not be provided. That is, the ions generated in or by the ultra-violet spectrometer may be passed directly to an inlet of the mass and/or ion mobility spectrometer 10, e.g. via a suitable sampling orifice, and hence directly into the vacuum stages of the mass and/or ion mobility spectrometer 10.

Although the techniques described herein have been exemplified with reference to gas chromatography, it will be appreciated that other suitable chromatography or separation devices may be used to initially separate the analyte material, provided that they may be coupled to both a ultra-violet or other non-destructive detector and a mass and/or ion mobility spectrometer in a similar manner to that described above. For example, instead of a gas chromatography device, the separation device may comprise a liquid chromatography device, or any of: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

Although the present invention has been described with reference to various embodiments, it will be understood by those skilled in the art that various changes in form and detail may be made without departing from the scope of the invention as set forth in the accompanying claims,

The invention claimed is:

1. An analysis instrument comprising:
    a chromatographic or other separation device for separating gaseous analyte material according to retention time;
    an ultra-violet ("UV") spectrometer or detector for obtaining ultra-violet spectral data of at least a portion of the analyte material separated in said chromatographic or other separation device; and
    a mass and/or ion mobility spectrometer for obtaining mass and/or ion mobility spectral data of ions generated from at least a portion of the analyte material separated in said chromatographic or other separation device.

2. An instrument as claimed in claim 1, wherein said chromatographic or other separation device comprises a gas chromatograph.

3. An instrument as claimed in claim 1, wherein said ultra-violet spectrometer or detector comprises a flow cell vacuum ultra-violet ("VUV") absorption detector.

4. An instrument as claimed in claim 1, further comprising a data recording system for recording one or more multidimensional data sets comprising said ultra-violet spectral data and said mass and/or ion mobility spectral data arranged according to retention time.

5. An instrument as claimed in claim 1, wherein said mass and/or ion mobility spectrometer is located downstream of said ultra-violet spectrometer or detector such that analyte material is caused to pass from said ultra-violet spectrometer or detector to an inlet of said mass and/or ion mobility spectrometer for subsequent mass and/or ion mobility analysis.

6. An instrument as claimed in claim 5, further comprising an ion source for generating ions from at least a portion of the analyte material separated in said chromatographic or other separation device, wherein said ion source is located downstream of said ultra-violet spectrometer or detector and upstream of said mass and/or ion mobility spectrometer.

7. An instrument as claimed in claim 5, wherein at least a portion of the analyte material is ionised within or by said ultra-violet spectrometer or detector.

8. An instrument as claimed in claim 1, wherein a first portion of the analyte material separated in said chromatographic or other separation device is directed to said ultra-violet spectrometer or detector and a second portion of the analyte material separated in said chromatographic or other separation device is directed to an ion source located upstream of said mass and/or ion mobility spectrometer.

9. A method of analysis comprising:
    separating gaseous analyte material according to retention time using a chromatographic or other separation device;
    obtaining ultra-violet ("UV") spectral data of at least a portion of the analyte material separated in said chromatographic or other separation device using a ultra-violet spectrometer or detector;
    ionising at least a portion of the analyte material separated in said chromatographic or other separation device; and
    obtaining mass and/or ion mobility spectral data of said ionised analyte material.

10. A method as claimed in claim 9, further comprising obtaining one or more multidimensional data sets comprising said ultra-violet spectral data and said mass and/or ion mobility spectral data arranged according to retention time.

11. A method as claimed in claim 10, comprising comparing said multidimensional data set, or at least a subset of values from said multidimensional data set, with respective data values contained within a library to identify and/or characterise one or more components of said analyte material.

12. A method as claimed in claim 9, further comprising:
    extracting one or more signals from said ultra-violet spectral data corresponding to one or more wavelengths of interest;
    determining a retention time(s) associated with said one or more signals; and
    extracting one or more mass and/or ion mobility spectra obtained at the determined retention time(s) from said mass and/or ion mobility spectral data.

13. A method as claimed in claim 9, further comprising:
    extracting one or more signals from said mass and/or ion mobility spectral data corresponding to a mass, mass to charge ratio and/or ion mobility value or range of values of interest;
    determining a retention time(s) associated with said one or more signals; and
    extracting one or more ultra-violet spectra obtained at the determined retention time(s) from said ultra-violet spectral data.

14. A method as claimed in claim 9, further comprising using said mass and/or ion mobility spectral data to assist in de-convoluting said ultra-violet spectral data.

15. A method as claimed in claim 9, further comprising adding one or more compounds having characteristic ultra-violet absorption signatures to said analyte material prior to obtaining said ultra-violet spectral data.

16. A method as claimed in claim 15, wherein said one or more compounds comprise an ion mobility spectrometry ("IMS") shift reagent.

17. A method of analysis comprising:
    passing analyte material to an ultra-violet spectrometer or detector and obtaining ultra-violet ("UV") spectral data of the analyte material;
    ionising at least a portion of the analyte material; and
    obtaining mass and/or ion mobility spectral data of said ionised analyte material.

18. A method as claimed in claim 17, further comprising using said mass and/or ion mobility spectral data to assist in de-convoluting said ultra-violet spectral data.

19. A method as claimed in claim 17, further comprising adding one or more compounds having characteristic ultra-violet absorption signatures to said analyte material prior to obtaining said ultra-violet spectral data.

20. A method as claimed in claim 19, wherein said one or more compounds comprise an ion mobility spectrometry ("IMS") shift reagent.

* * * * *